UNITED STATES PATENT OFFICE.

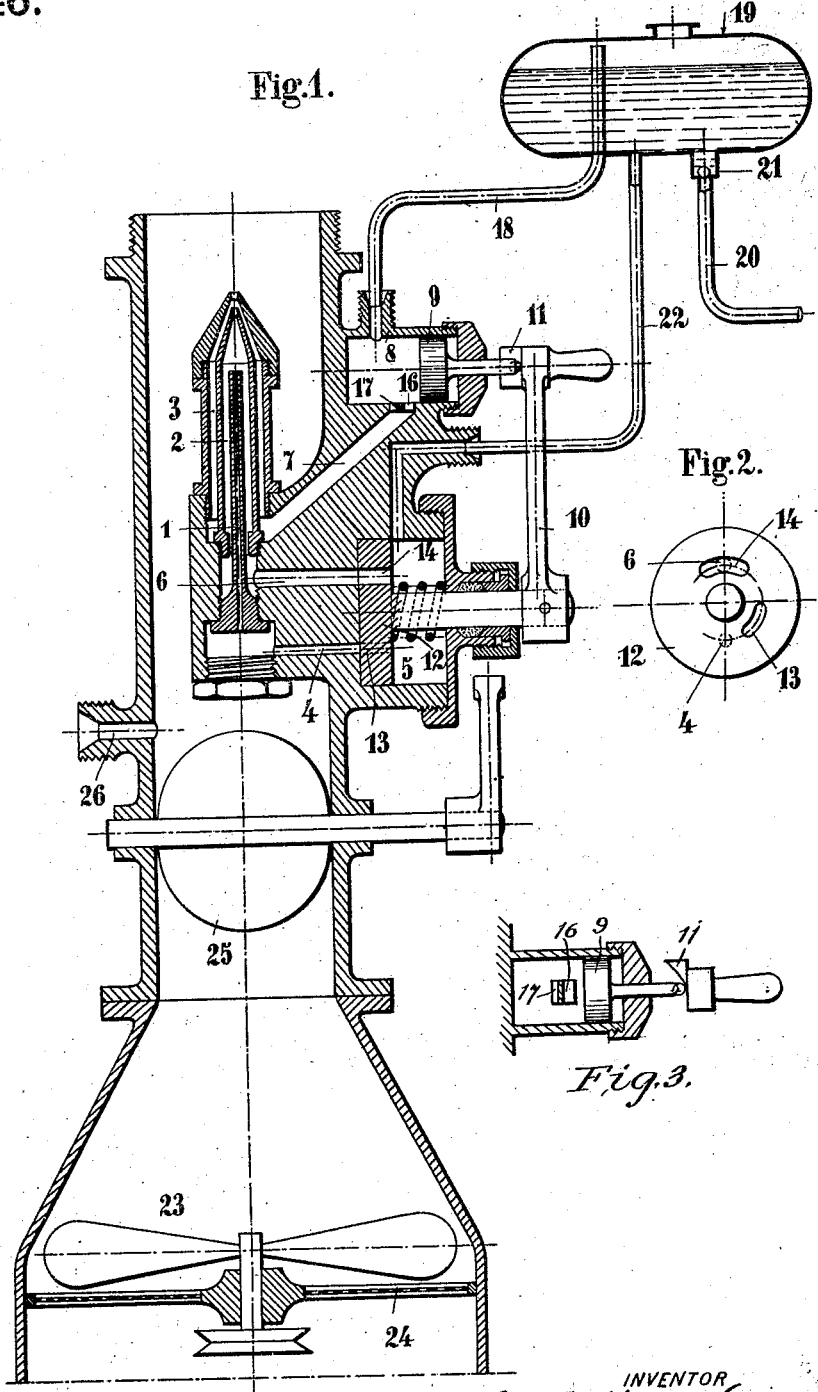

CLAUDE MARIUS CARREL, OF PARIS, FRANCE, ASSIGNOR TO HIMSELF AND LEON NOEL MAURIER, OF PARIS, FRANCE.

PRESSURE-CARBURETER.

1,157,146.  Specification of Letters Patent.  Patented Oct. 19, 1915.

Application filed February 1, 1915. Serial No. 5,429.

*To all whom it may concern:*

Be it known that I, CLAUDE MARIUS CAR-REL, a citizen of the Republic of France, and resident of Paris, France, (post-office address 124 Rue Ménilmontant,) have invented a new and useful Pressure-Carbureter, which carbureter is fully set forth in the following specification.

The present invention relates to pressure carbureters permitting of supplying the engine with a mixture of air carbureted simply by contact on leaving the sprayer, and gas constituted by air under pressure charged with vapors of fuel by mixing.

The pressure carbureter forming the subject of the invention is illustrated, by way of example, in the accompanying drawing, in which—

Figure 1 is a vertical section through the whole device. Fig. 2 is an elevation of a detail. Fig. 3 is a part-sectional view of a further detail.

The sprayer is constituted by three concentric nozzles 1, 2, 3, and of these the nozzle 1 communicates through the medium of the conduit 4 with the chamber 5; the nozzle 2 communicates through the medium of the conduit 6 having a greater cross-sectional area than the conduit 4, with the same chamber; and the nozzle 3 communicates through the medium of the conduit 7 with the cylinder 8. In the latter there moves the piston 9 controlled by a manually-operated oscillating arm 10 and provided to this end with a projection 11 acting on the rod of the said piston; the same arm controls simultaneously the rotation of a plate 12, to the stem of which it is suitably fixed, said plate being arranged in the chamber 5 and formed with two openings 13, 14 adapted to register alternately with the conduits 4, 6 according to the position of the arm 10; according to this position also, the piston 9 shuts or opens the larger (16) of the two orifices 16, 17 formed at the point where the conduit 7 opens into the cylinder 8.

The cylinder 8 is, moreover, connected through a conduit 18 with the upper part of the fuel tank 19, into the lower part of which opens the pipe 20 through which compressed air is supplied; a ball valve is provided at 21. The tank 19 communicates, moreover, with the chamber 5 through the conduit 22.

The position of the parts illustrated in Fig. 1, corresponds to that of operation at high speed, that is to say the cam 11 on the arm 10 being out of alinement with the stem of the piston 9, the latter uncovers the orifice 16 and the opening 14 of the plate 12 registers with the conduit 6. The air which enters the tank 19 under pressure through the pipe 20 is charged with the vapors of fuel by passing through the said tank, after which it passes successively through the pipe 18, the cylinder 8, the orifices 16, 17, and the conduit 7, to the sprayer and escapes through the nozzle 3 into the engine. At the same time, fuel passes successively through the pipe 22, the chamber 5, the opening 14 in plate 12 and the conduit 6, to the nozzle 2 and on leaving the sprayer, mixes with the fuel-charged air. For slow running, the arm 10 is displaced in such a manner that the cam 11 is brought into line with the rod of the piston 9, so as to move the latter inwardly and thus close the orifice 16 at the same time that, owing to the angular displacement of the plate 12, the chamber 5 only communicates with the conduit 4 through the opening 13. In such instance, the quantity of fuel-charged air passing through the reduced orifice 17, is exactly proportionate to the reduced quantity of fuel passing through the conduit 4 having a restricted cross-sectional area; the fuel then passes through the central nozzle 1. A propeller or screw 23 is arranged above a perforated sheet metal plate 24 to prevent impurities from penetrating and causing wear on the parts, and is rotated at a suitable speed so as to insure the filling of the cylinder with air. For very accelerated running, the butterfly valve 25 is closed and through the opening 26 air is supplied under a pressure which is greater than that of the air supplied through the pipe 20.

The device illustrated in Figs. 1 and 2, constituted by the plate 12, the cylinder 8 and the arm 10, is indicated by way of example as a means for controlling simultaneously the output of fuel and of fuel-charged air; it must be therefore understood that other controlling devices may be used; the fuel-charged air and the fuel may also be controlled independently, if desired, in any suitable manner.

Finally, it must also be understood that the scope of the invention comprises a carbureter operating exclusively by the simple mixture of air and fuel at the outlet of the sprayer, operating in this case as a fuel atomizer, using, to this end, the above described device.

The gaseous mixture being under pressure, it may be used for feeding lamps and lanterns of the vehicle on which the carbureter is in use for supplying or feeding the engine.

What I claim is:

1. A pressure carbureter comprising, in combination, a sprayer consisting of three concentric nozzles; a fuel tank; a compressed air-supply pipe leading into the bottom of said tank; a cylinder having a passage leading therefrom to the outer nozzle; a pipe leading from the top of said tank to said cylinder, to supply fuel-charged air from the former to the latter; a piston working in said cylinder to control the delivery of the charged air therefrom through said passage to said outer nozzle; a controlling chamber having a pair of passages leading therefrom to the intermediate and inner nozzles; a member rotatably mounted in said chamber and formed with a pair of orifices adapted to alternately open and close the second-named passages; a fuel-supply pipe leading from said tank to said chamber; and means for operating said piston and said rotatably-mounted member.

2. A pressure carbureter comprising, in combination, a sprayer consisting of three concentric nozzles; a fuel tank; a compressed air-supply pipe leading into the bottom of said tank; a cylinder having a passage leading therefrom to the outer nozzle; a pipe leading from the top of said tank to said cylinder, to supply fuel-charged air from the former to the latter; a piston working in said cylinder to control the delivery of the charged air therefrom through said passage to said outer nozzle; a controlling chamber having a pair of passages leading therefrom to the intermediate and inner nozzles; a member rotatably mounted in said chamber and formed with a pair of orifices adapted to alternately open and close the second-named passages; a fuel-supply pipe leading from said tank to said chamber; and a manually operable device for simultaneously operating said piston and said rotatably-mounted member.

3. A pressure carbureter comprising, in combination, a sprayer consisting of three concentric nozzles; a fuel tank; a compressed air-supply pipe leading into the bottom of said tank; a cylinder having a passage leading therefrom to the outer nozzle; a pipe leading from the top of said tank to said cylinder, to supply fuel-charged air from the former to the latter; a piston working in said cylinder to control the delivery of the charged air therefrom through said passage to said outer nozzle, a controlling chamber having a pair of passages leading therefrom to the intermediate and inner nozzles; a member rotatably mounted in said chamber and formed with a pair of orifices adapted to alternately open and close the second-named passages; a fuel-supply pipe leading from said tank to said chamber; and a manually-operable device connected to rotate said rotatably-mounted member and provided with a cam for simultaneously operating said piston.

4. A pressure carbureter comprising, in combination, a sprayer consisting of three concentric nozzles; a fuel tank; a compressed air-supply pipe leading into the bottom of said tank; a cylinder having a passage leading therefrom to the outer nozzle; a pipe leading from the top of said tank to said cylinder, to supply fuel-charged air from the former to the latter; a piston working in said cylinder to control the delivery of the charged air therefrom through said passage to said outer nozzle; a controlling chamber having a pair of passages of different areas leading therefrom to the intermediate and inner nozzles; a plate rotatably mounted in said chamber and having a pair of orifices of different sizes adapted to alternately open and close the second-named passages; a fuel-supply pipe leading from said tank to said chamber; and operating means for said plate and said piston.

5. A pressure carbureter comprising, in combination, a sprayer consisting of three concentric nozzles; a fuel tank; a compressed air-supply pipe leading into the bottom of said tank; a cylinder having a passage leading therefrom to the outer nozzle; a pipe leading from the top of said tank to said cylinder, to supply fuel-charged air from the former to the latter; a piston working in said cylinder to control the delivery of the charged air therefrom through said passage to said outer nozzle; a controlling chamber having a pair of passages leading therefrom to the intermediate and inner nozzles; a plate rotatably mounted in said chamber and having a pair of orifices for controlling the second-named passages; and a common operating device for said plate and said piston.

6. A pressure carbureter comprising, in combination, a sprayer consisting of three concentric nozzles; a fuel tank; a compressed air-supply pipe leading into the bottom of said tank; a cylinder having a passage leading therefrom to the outer nozzle; a pipe leading from the top of said tank to said cylinder, to supply fuel-charged air from the former to the latter; a piston working in said cylinder to control the delivery of the charged air therefrom through said passage to said outer nozzle; a controlling chamber having a pair of passages leading therefrom to the intermediate and inner nozzles; a plate rotatably mounted in said chamber and having a pair of orifices for controlling the second-named passages; and an arm connected to rotate said plate and having a cam for simultaneously operating said piston.

In testimony whereof I have signed this specification in the presence of two subscribing witnesses.

CLAUDE MARIUS CARREL.

Witnesses:
 DAVID C. POOLE, Jr.,
 M. SEAUCLAIR.